United States Patent
Choudhary et al.

(10) Patent No.: US 8,156,419 B2
(45) Date of Patent: Apr. 10, 2012

(54) INTELLIGENT PRELOADS OF VIEWS AND ASYNCHRONOUS LOADING OF MODELS USING THE MVC DESIGN PATTERN

(75) Inventors: Samar Choudhary, Morrisville, NC (US); Richard Adam King, Cary, NC (US); Vijay Pandiarajan, Apex, NC (US); Niraj D. Patel, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 12/175,113

(22) Filed: Jul. 17, 2008

(65) Prior Publication Data

US 2010/0017696 A1  Jan. 21, 2010

(51) Int. Cl.
*G06F 17/00* (2006.01)
(52) U.S. Cl. ...................................................... 715/209
(58) Field of Classification Search .................. 715/203, 715/209, 255, 256
See application file for complete search history.

(56) References Cited

U.S. PATENT DOCUMENTS

| | | | | |
|---|---|---|---|---|
| 5,848,424 A | * | 12/1998 | Scheinkman et al. | 715/210 |
| 5,956,720 A | * | 9/1999 | Fernandez et al. | 1/1 |
| 6,003,046 A | * | 12/1999 | Nielsen | 715/206 |
| 6,029,180 A | * | 2/2000 | Murata et al. | 715/251 |
| 6,038,601 A | | 3/2000 | Lambert et al. | |
| 6,571,279 B1 | | 5/2003 | Herz et al. | |
| 7,992,102 B1 | * | 8/2011 | De Angelo | 715/834 |
| 2004/0049541 A1 | * | 3/2004 | Swahn | 709/203 |
| 2004/0088375 A1 | | 5/2004 | Sethi et al. | |
| 2006/0095443 A1 | * | 5/2006 | Kumar et al. | 707/100 |
| 2006/0129635 A1 | * | 6/2006 | Baccou et al. | 709/203 |
| 2007/0209006 A1 | * | 9/2007 | Arthurs et al. | 715/733 |

OTHER PUBLICATIONS

Google Labs, Google Web Accelerator, web site, printed Jul. 9, 2008, http://webaccelerator.google.com/support.html.

* cited by examiner

*Primary Examiner* — Laurie Ries
(74) *Attorney, Agent, or Firm* — Kenneth P. Waszkiewicz

(57) ABSTRACT

In one embodiment, the present invention is a system and method for loading a web page in a browser application. The method sends a request to retrieve the web page, receives a response to the request that includes the web page, and displays the web page in the browser application. The web page includes a static view portion, a dynamic view portion, and at least one possible action that a user may take from the web page. When the user takes each possible action, the browser application will display a related web page. The method receives a second response to the request that includes the static view portion of the related web page for each possible action, and stores the static view portion of the related web page for each possible action.

20 Claims, 3 Drawing Sheets

INTELLIGENT PRELOADS OF VIEWS AND ASYNCHRONOUS LOADING OF MODELS USING THE MVC DESIGN PATTERN

BACKGROUND OF THE INVENTION

1. Field of the Invention

The present invention relates, in general, to computing systems in a distributed data processing environment. In particular, the present invention is a system and method for loading a web page in a browser application.

2. Description of the Related Art

A web page is a document written in the hypertext markup language (HTML) and translated by a web browser. The web page includes a static view portion and a dynamic view portion. The static view portion of the web page shows the same content each time a user views the web page and includes user interface control components (i.e., buttons, checkboxes, panels, etc.), web page headers, hypertext, and the like. The dynamic view portion of the web shows content that can change each time a user views the web page and includes data displayed in a user interface display components (i.e., list boxes, dropdown lists, etc.), applets, scripts, or the like.

A hypertext link is a word, phrase, or image in a web page that is marked using HTML. The HTML marking changes the display of the marked hypertext in the web browser (typically underlining the hypertext changing the color to blue) and associates an HTML target with the marked hypertext. When a user clicks on the marked hypertext with a pointing device, such as a mouse, the web browser will load (i.e., jump to) the target HTML document. The HTML target may be to another section of the same web page, another web page in the same domain, or another web page in a different domain. Thus, the hypertext link is a navigation element in a web page.

A web page may also mark objects, hypertext, or hot areas (i.e., coordinates of a specific are on a display), and associate the marked area with a script or applet, such that when a user clicks on the marked area with a pointing device, such as a mouse, the web browser will call the script or applet. These marked areas are not hypertext links, but will function as a hypertext link when the script or applet makes a call to load a web page. These marked areas that function as hypertext links are hidden links.

The model-view-controller (MVC) design pattern in software engineering isolates the business logic of the application from the user interface considerations, thus resulting in an application where it is easier to modify either the visual appearance of the application or the underlying business rules without affecting the other. In MVC, the "Model" represents the information (i.e., the data) of the application and the business rules used to manipulate the data; the "View" corresponds to elements of the user interface such as text, checkbox items, and so forth; and the "Controller" manages details involving the communication to the model of user actions such as keystrokes and mouse movements. Thus, a web application based on the MVC design pattern separates the web pages into a static view portion and a dynamic view portion.

The term Web 2.0 is ascribed to a trend in the use of World Wide Web technology and web design that aims to enhance creativity, information sharing, and, most notably, collaboration among users. These concepts have led to the development and evolution of web-based communities and hosted services, such as weblogs (blogs), wikis, podcasts, really simple syndication (RSS) feeds and other forms of many-to-many publishing, social networking software, and web application programming interfaces (APIs) provide enhancements over read-only websites.

Since web pages that are based on Web 2.0, MVC design patterns, and the like have more dynamic data than previous web pages, a major focus has been placed on improving the usability of web applications by drastically improving web page load times. Prior art solutions have focused on statically preloading the target web pages associated with all existing hypertext links on a displayed web page. Since these prior art solutions focus on analyzing the displayed web page to identify hypertext links, these solutions neglect to preload related web pages that are accessed via a non-hypertext link web page object on the displayed web page, such as a script, applet, servlet, or the like. Other prior art solutions rely on server-based caching proxies to serve the same content to multiple users. These other prior art solutions also neglect to preload related web pages that are accessed via a non-hypertext link web page object on the displayed web page, such as a script, applet, servlet, or the like.

Thus, there is a need for a new solution for prefetching or preloading future related web pages in a dynamic web application that uses late bound dynamic rules, or brokers, that leverage the separation of the web page into a static view portion and a dynamic view portion. The presently disclosed method and system satisfies this demand.

SUMMARY OF THE INVENTION

In one embodiment, the present invention is a system and method for loading a web page in a browser application. The method sends a request to retrieve the web page, receives a response to the request that includes the web page, and displays the web page in the browser application. The web page includes a static view portion, a dynamic view portion, and at least one possible action that a user may take from the web page. When the user takes each possible action, the browser application will display a related web page. The method receives a second response to the request that includes the static view portion of the related web page for each possible action, and stores the static view portion of the related web page for each possible action. When a user takes a selected action from said at least one possible action, the method retrieves the static view portion of the related web page associated with the selected action, and displays the static view portion of the related web page in the browser application. The method sends a second request to retrieve the dynamic view portion of the related web page, receives a third response that includes the dynamic view portion of the related web page, and displays the dynamic view portion of the related web page in the browser application.

In another embodiment, the method for loading a web page in a browser application receives a request to retrieve the web page, retrieves the web page, and sends a response that includes the web page. The web page includes a static view portion and a dynamic view portion. The method determines at least one possible action that a user may take from the web page. When a user takes each possible action, the browser application will display a related web page. The method retrieves the static view portion of the related web page for each possible action, and sends a second response that includes the static view portion of the related web page for each possible action. When a user takes a selected action from said at least one possible action, the method receives a second request to retrieve the dynamic view portion of the related web page associated with the selected action. The method retrieves the dynamic view portion of the related web page, and sends a third response that includes the dynamic view portion of the related web page.

DETAILED DESCRIPTION OF THE INVENTION

Figure 1:
FIG. 1 is a network diagram that illustrates the hardware components comprising one embodiment of a system that performs the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable mediums may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a network diagram that illustrates the hardware components comprising one embodiment of a system that performs the present invention. The architecture shown in FIG. 1 utilizes a network 100 to connect a number of client computers 110 to a single server computer 120 that performs the method of the present invention. In another embodiment, the server computer 120 distributes the processing that it performs among a number of server computers. In yet another embodiment, the server computer 120 distributes the processing that it performs among a combination of a server computer and a number of general-purpose computers. In yet another embodiment, the server computer 120 distributes the processing that it performs among the client computers 110 and the server computer 120.

The network 100 shown in FIG. 1, in one embodiment, is a public communication network that connects and enables data transfer between the client computers 110 and the server computer 120. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA) or Code Division Multiple Access (CDMA) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

Figure 2:
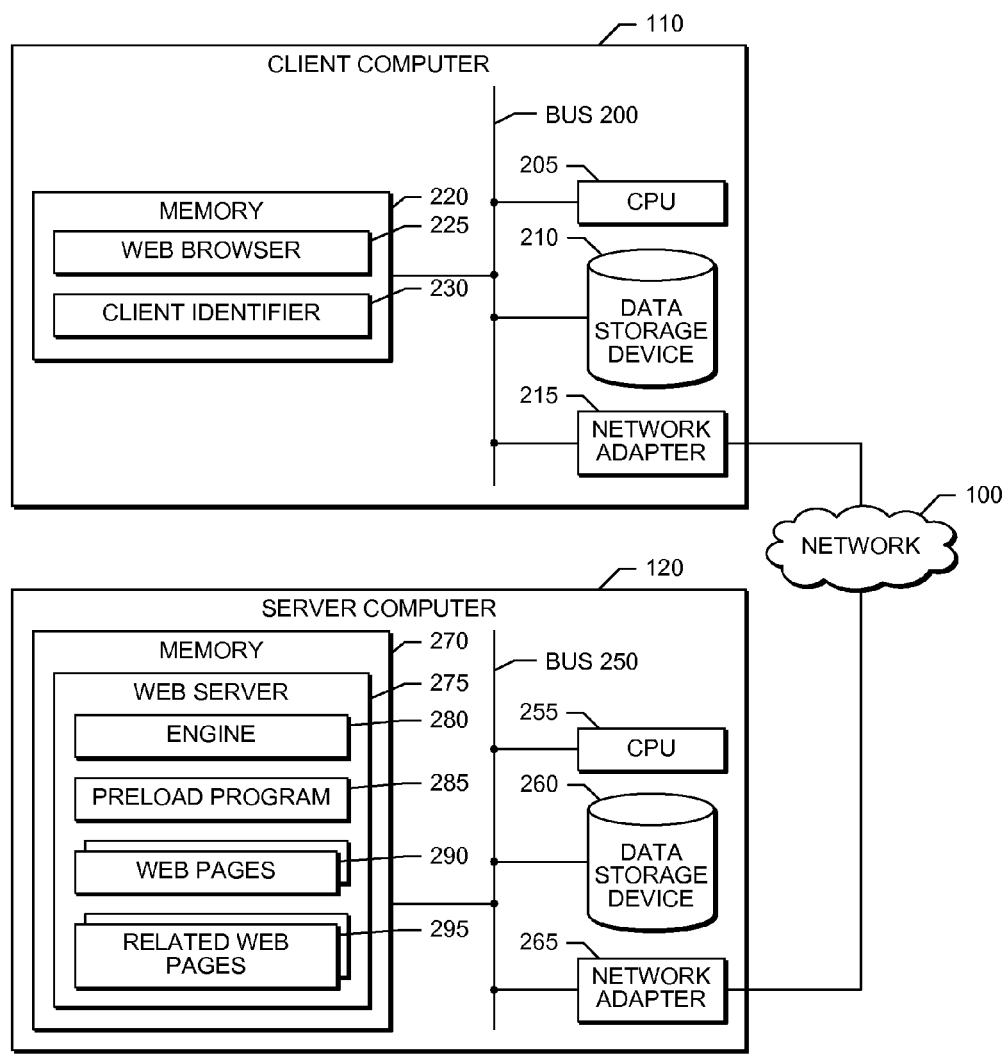
FIG. 2 is a block diagram that illustrates one embodiment of the system components shown in FIG. 1.

FIG. 2 is a block diagram that illustrates one embodiment of the system components shown in FIG. 1. In particular, FIG. 2 illustrates, in greater detail, the hardware and software components that comprise the client computer 110 and the server computer 120.

As shown in FIG. 2, the client computer 110 is a general-purpose computer. A bus 200 is a communication medium that connects a central processor unit (CPU) 205, data storage device 210, network adapter 215, and memory 220. The network adapter 215 also connects to the network 100 and is the mechanism that facilitates the passage of network traffic between the client computer 110 and the network 100.

The CPU 205 can be a commercially available or custom microprocessor that performs the disclosed methods by executing the sequences of operational instructions that comprise each computer program resident in, or operative on, the memory 220. It is to be understood that the memory 220 may include operating system, administrative, and database programs that support the programs disclosed in this application. The memory 220 is representative of the overall hierarchy of memory devices containing the software and data used to implement the functionality of the client computer 110. The memory 220 can include, but is not limited to, cache, ROM, PROM, EPROM, EEPROM, flash memory, SRAM, and DRAM. In one embodiment, the configuration of the memory 220 of the client computer 110 includes a web browser 225, and a client identifier 230. These computer programs store intermediate results in the memory 220, or data storage device 210. In another embodiment, the memory 220 may swap these programs, or portions thereof, in and out of the memory 220 as needed, and thus may include fewer than all of these programs at any one time.

In one embodiment, the client identifier 230 is stored in a file referred to as a cookie. The server computer 120 may assign and send the client identifier 230 to the client computer 110 once when the client computer 110 first communicates with the server computer 120. From then on, the client computer 110 includes its client identifier 230 with all messages sent to the server computer 120 so the server computer 120 can identify the source of the message.

The server computer 120 shown in FIG. 2 is a general-purpose computer that provides server functionality including file services, web page services, and the like. A bus 250 is a communication medium that connects a central processor unit (CPU) 255, data storage device 260, network adapter 265, and memory 270. The network adapter 265 also connects to the network 100 and is the mechanism that facilitates the passage of network traffic between the server computer 120 and the network 100.

The CPU 255 can be a commercially available or custom microprocessor that performs the disclosed methods by executing the sequences of operational instructions that comprise each computer program resident in, or operative on, the memory 270. It is to be understood that the memory 270 may include operating system, administrative, and database programs that support the programs disclosed in this application. The memory 270 is representative of the overall hierarchy of memory devices containing the software and data used to implement the functionality of the server computer 120. The memory 270 can include, but is not limited to, cache, ROM, PROM, EPROM, EEPROM, flash memory, SRAM, and DRAM. In one embodiment, the configuration of the memory 270 of the server computer 120 includes a web server 275 that includes an engine 280, preload program 285, web pages 290, and related web pages 295. These computer programs store intermediate results in the memory 270, or data storage device 260. These programs also receive input from the client computers 110, and display the results to the client computers 110. In another embodiment, the memory 270 may swap these programs, or portions thereof, in and out of the memory 270 as needed, and thus may include fewer than all of these programs at any one time.

The web server 275, in one embodiment, is a web application that accepts hypertext transfer protocol (HTTP) requests from the client computer 110, and serves HTTP responses that include optional data contents, such as hypertext markup language (HTML) web pages 290, related web pages 295, linked objects (e.g., images, scripts, etc.), and the like. The web server 275 includes an engine 280, preload program 285, web pages 290, and related web pages 295. The engine 280 receives the requests from the client computer 110, and sends the responses to the client computer 110. The requests utilize a uniform resource locator (URL) address to identify the requested HTML web pages 290, related web pages 295, linked objects, and the like. The preload program 285 determines the possible actions that a user can take from web page displayed in a web browser on the client computer 110, determines the related web page 295 that will load in the web browser 225 when the user takes each possible action, and communicates with the engine 280 to send response messages to the client computer 110 to preload the static portion of the related web pages 295. In one embodiment, the preload program 285 determines the possible actions by analyzing the web page. In another embodiment, the preload program 285 is a broker mechanism that utilizes a lookup table to determine the possible actions.

Figure 3:
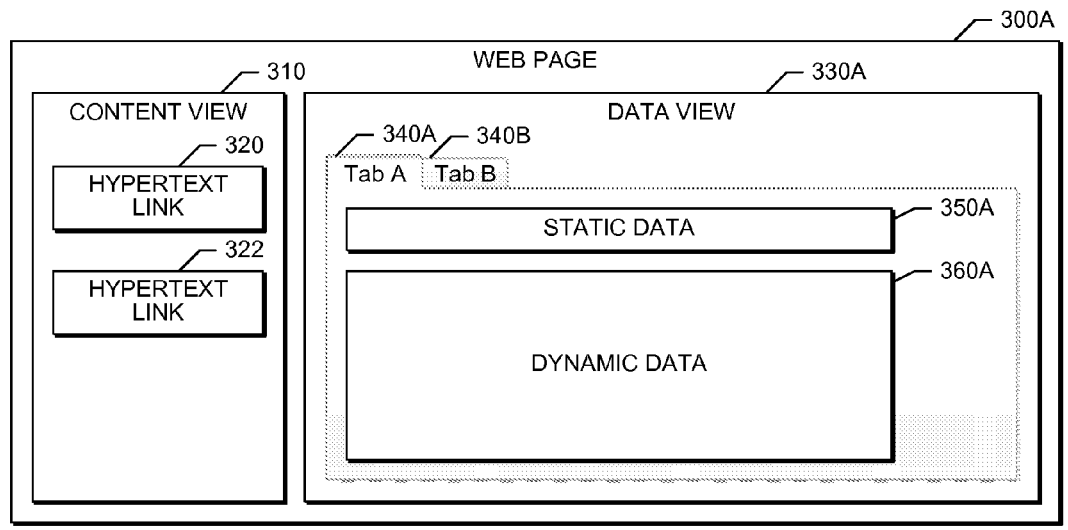
FIG. 3 is a block diagram that illustrates one embodiment of a web page displayed on the client computer 110 shown in FIG. 2.

FIG. 3 is a block diagram that illustrates one embodiment of a web page displayed on the client computer 110 shown in FIG. 2. Web page 300A shown in FIG. 3 is supplied by the web server 275 and displayed in the web browser 225 on the client computer 110. The web page 300A shown in FIG. 3 is partitioned into two panels, a content view 310 panel, and a data view 330A panel. In other embodiments, the number and configuration of the panels (i.e., views) may vary. The content view 310 panel includes hypertext links 320, 322 that, when clicked by a user, will send a request to the web server 275 to load one of the related web pages 295. The data view 330A panel includes two tab control user interface components 340A, 340B, where Tab A 340A is in the foreground, and Tab B 340B is in the background. Tab A 340A includes static data 350A and dynamic data 360A. Since Tab B 340B is in the background, the components that comprise Tab B 340B are not included in the web page 300A shown in FIG. 3. However, Tab B 340B is a user interface component that, when clicked by the user, will call a script or applet that will send a request to the web server 275 to load a related web page 295 (i.e., the web page 300B shown in FIG. 4). The static view of the web page 300A shown in FIG. 3 includes the hypertext links 320, 322 in the content view 310, and the static data 350A portion of Tab A 340A. The dynamic view of the web page 300A shown in FIG. 3 includes the dynamic data 360A portion of Tab A 340A.

Figure 4:
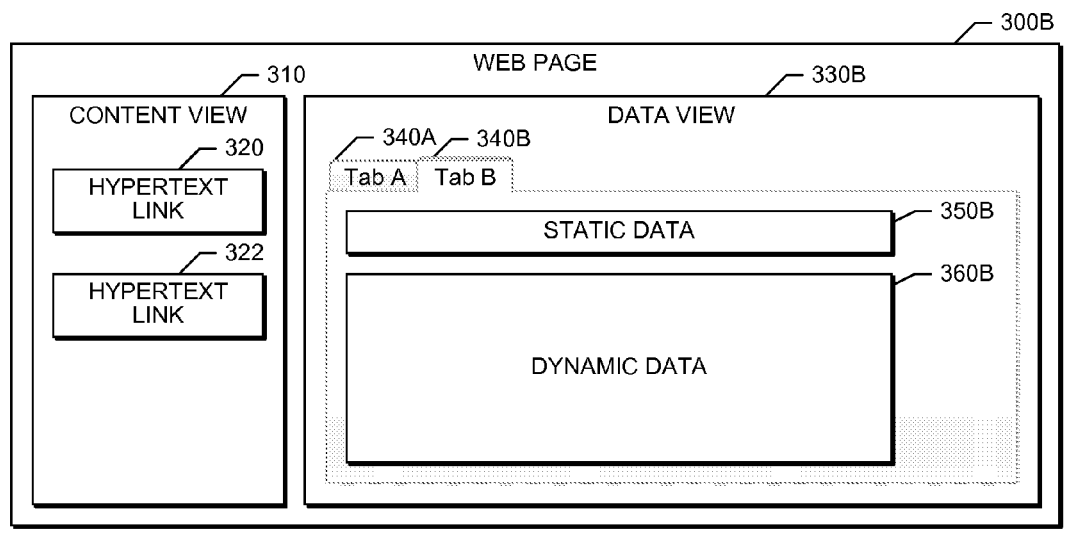
FIG. 4 is a block diagram that illustrates one embodiment of a web page related to the web page shown in FIG. 3.

FIG. 4 is a block diagram that illustrates one embodiment of a web page related to the web page shown in FIG. 3. Web page 300B shown in FIG. 4 is supplied by the web server 275 and displayed in the web browser 225 on the client computer 110. The web page 300B shown in FIG. 4 is partitioned into two panels, a content view 310 panel, and a data view 330B panel. In other embodiments, the number and configuration of the panels (i.e., views) may vary. The content view 310 panel includes hypertext links 320, 322 that, when clicked by a user, will send a request to the web server 275 to load one of the related web pages 295. The data view 330B panel includes two tab control user interface components 340A, 340B, where Tab A 340A is in the background, and Tab B 340B is in the foreground. Tab B 340B includes static data 350B and dynamic data 360B. Since Tab A 340A is in the background, the components that comprise Tab A 340A are not included in the web page 300B shown in FIG. 4. However, Tab A 340A is a user interface component that, when clicked by the user, will call a script or applet that will send a request to the web server 275 to load a related web page 295 (i.e., the web page 300A shown in FIG. 3). The static view of the web page 300B shown in FIG. 4 includes the hypertext links 320, 322 in the content view 310, and the static data 350B portion of Tab B 340B. The dynamic view of the web page 300B shown in FIG. 4 includes the dynamic data 360B portion of Tab B 340B.

After the engine 280 of the web server 275 sends the response to supply the web page 300A shown in FIG. 3, the preload program 285 analyzes the web page 300A to determine the possible actions that a user can take from the web page 300A. The preload program 285 will determine that a user has three possible actions from the web page 300A, clicking on either of the hypertext links 320, 322, and clicking on Tab B 340B. The hypertext links 320, 322 are obvious navigation elements; however, Tab B 340B is a clickable web object and a hidden link because when a user clicks on Tab B 340B in the web page 300A shown in FIG. 3, the client computer 110 will call to a program component, such as a script, applet, or the like, that will load a related web page 295 in the web browser 225. The preload program 285 will communicate with the engine 280 to send response messages to the client computer 110 to preload the static portion of the related web pages 295 that will load in the web browser 225 when the user clicks on the hypertext links 320, 322, or Tab B 340B.

Figure 5:
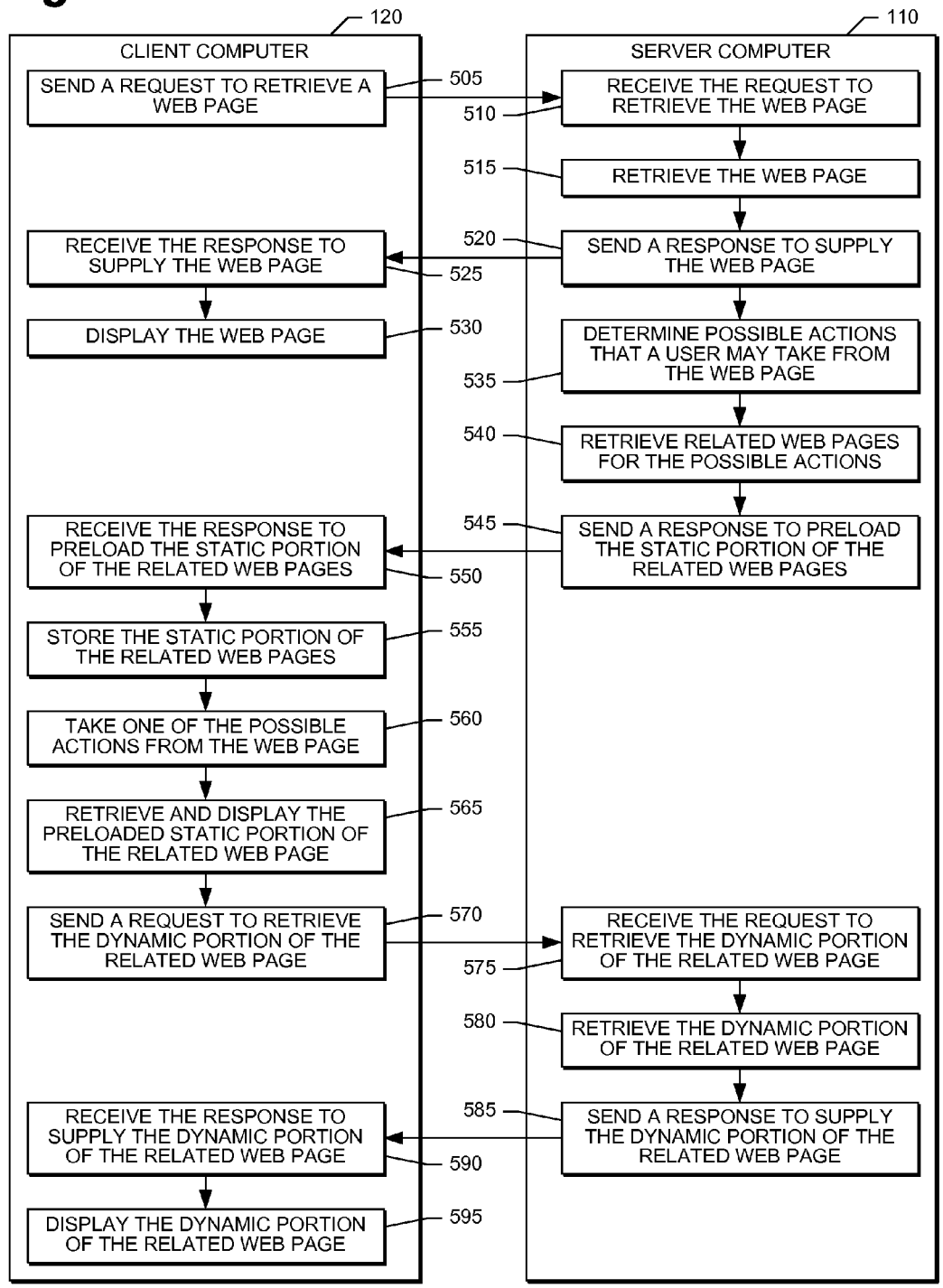
FIG. 5 is a flow chart that illustrates one embodiment of the method for loading a web page in a browser application.

FIG. 5 is a flow chart that illustrates one embodiment of the method for loading a web page in a browser application. With reference to the system components shown in FIG. 2, the method shown in FIG. 5 begins with the client computer 110 sending a request to retrieve a web page 290 to the server computer 120 (step 505). The server computer 120 receives the request to retrieve the web page 290 (step 510), retrieves the web page 290 (step 515), and sends a response to the client computer 110 to supply the retrieved web page 290 (step 520). The client computer 110 receives the response to supply the web page 290 (step 525), and displays the web page (step 530) in the web browser 225. In one embodiment, the request and response messages are HTTP request and response messages.

Referring again to FIG. 5, after sending the response to supply the web page 290 (step 520), the server computer 120 determines possible actions that a user may take from the web page 290 (step 535). In one embodiment, the server computer 120 determines the possible actions by analyzing the web page 290. In another embodiment, the server computer 120 communicates with a broker mechanism to identify the related web pages 295 associated with the web page 290. In yet another embodiment, the server computer 120 determines the possible actions using prior usage patterns for the user. The server computer 120 retrieves the related web page 295 for each possible action (step 540) and sends a response to the client computer 110 to preload the static portion of the retrieved related web page 295 (step 545). The client computer 110 receives the response to preload the static portion of the related web page 295 (step 550), and stores the static portion of the related web pages (step 555) in the memory 220. In one embodiment, the response message is an HTTP response message. In another embodiment, the sending of the response to preload the static portion of the related web page 295 (step 545) is combined with the sending of the response to supply the web page (step 520).

Referring again to FIG. 5, after storing the static portion of the related web pages 295 (step 555), a user operating the web browser 225 on the client computer 110 takes one of the possible actions from the web page 290 (step 560). In one embodiment, the user clicks with a pointing device, such as a mouse, on a marked object, hypertext, or hot area to take one of the possible actions. The client computer 110 retrieves the preloaded static portion of the related web page 295 associated with the possible action taken by the user, and displays the preloaded static portion of the related web page 295 in the web browser 225 (step 565). The client computer 110 sends a request to the server computer 120 to retrieve the dynamic portion of the related web page 295 (step 570). The server computer 120 receives the request to retrieve the dynamic portion of the related web page 295 (step 575), retrieves the dynamic portion of the related web page 295 (step 580), and sends a response to the client computer 110 to supply the dynamic portion of the related web page 295 (step 585). In one embodiment, the server computer 120 retrieves the dynamic portion of the related web page 295 from the source. The client computer 110 receives the response to supply the dynamic portion of the related web page 295 (step 590) and displays the dynamic portion of the related web page 295 in the web browser 225 (step 595). In one embodiment, the request and response messages are HTTP request and response messages.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for loading a web page in a browser application, comprising:
   sending a request to retrieve the web page;
   receiving a response to the request, the response including the web page;
   displaying the web page in the browser application, the web page including a static view portion, a dynamic view portion, and at least one possible action, wherein, for each possible action, when a user takes the possible action, the browser application will display a related web page;
   receiving a second response to the request, the second response including the static view portion of the related web page for each possible action;
   storing the static view portion of the related web page for each possible action;
   taking a selected action from said at least one possible action;
   retrieving the static view portion of the related web page associated with the selected action;
   displaying the static view portion of the related web page in the browser application;
   sending a second request to retrieve the dynamic view portion of the related web page;
   receiving a third response to the second request, the third response including the dynamic view portion of the related web page; and
   displaying the dynamic view portion of the related web page in the browser application.

2. The method of claim 1, wherein the receiving of the response includes the receiving of the second response.

3. The method of claim 1, wherein said at least one possible action includes at least one of clicking on a hypertext link, and clicking on a hidden link.

4. The method of claim 1, wherein a broker mechanism determines said at least one possible action, the broker mechanism including a list of related web pages for the web page.

5. The method of claim 1, wherein prior usage patterns determine said at least one possible action.

6. A system for loading a web page in a browser application, comprising:
   a memory device resident in the computer; and
   a processor disposed in communication with the memory device, the processor configured to:
   send a request to retrieve the web page;
   receive a response to the request, the response including the web page;
   display the web page in the browser application, the web page including a static view portion, a dynamic view portion, and at least one possible action, wherein, for each possible action, when a user takes the possible action, the browser application will display a related web page;
   receive a second response to the request, the second response including the static view portion of the related web page for each possible action;
   store the static view portion of the related web page for each possible action;
   take a selected action from said at least one possible action;
   retrieve the static view portion of the related web page associated with the selected action;
   display the static view portion of the related web page in the browser application;
   send a second request to retrieve the dynamic view portion of the related web page;
   receive a third response to the second request, the third response including the dynamic view portion of the related web page; and
   display the dynamic view portion of the related web page in the browser application.

7. The system of claim 6, wherein the processor is configured to receive the response and the second response as a single response.

8. The system of claim 6, wherein said at least one possible action includes at least one of clicking on a hypertext link, and clicking on a hidden link.

9. The system of claim 6, wherein a broker mechanism determines said at least one possible action, the broker mechanism including a list of related web pages for the web page.

10. The system of claim 6, wherein prior usage patterns determine said at least one possible action.

11. A method for loading a web page in a browser application, comprising:
    receiving a request to retrieve the web page;
    retrieving the web page;
    sending a response to the request, the response including the web page including a static view portion and a dynamic view portion;
    determining at least one possible action that a user may take from the web page, wherein, for each possible action, when a user takes the possible action, the browser application will display a related web page;
    retrieving the static view portion of the related web page for each possible action;
    sending a second response to the request, the second response including the static view portion of the related web page for each possible action;

receiving a second request to retrieve the dynamic view portion of the related web page associated with a selected action from said at least one possible action;

retrieving the dynamic view portion of the related web page; and sending a third response to the second request, the third response including the dynamic view portion of the related web page.

12. The method of claim 11, wherein the sending of the response includes the sending of the second response.

13. The method of claim 11, wherein said at least one possible action includes at least one of clicking on a hypertext link, and clicking on a hidden link.

14. The method of claim 11, wherein a broker mechanism determines said at least one possible action, the broker mechanism including a list of related web pages for the web page.

15. The method of claim 11, wherein prior usage patterns determine said at least one possible action.

16. A system for loading a web page in a browser application, comprising:

a memory device resident in the computer; and a processor disposed in communication with the memory device, the processor configured to:

receive a request to retrieve the web page;

retrieve the web page;

send a response to the request, the response including the web page including a static view portion and a dynamic view portion;

determine at least one possible action that a user may take from the web page, wherein, for each possible action, when a user takes the possible action, the browser application will display a related web page;

retrieve the static view portion of the related web page for each possible action;

send a second response to the request, the second response including the static view portion of the related web page for each possible action;

receive a second request to retrieve the dynamic view portion of the related web page associated with a selected action from said at least one possible action;

retrieve the dynamic view portion of the related web page; and send a third response to the second request, the third response including the dynamic view portion of the related web page.

17. The system of claim 16, wherein the processor is configured to send the response and the second response as a single response.

18. The system of claim 16, wherein said at least one possible action includes at least one of clicking on a hypertext link, and clicking on a hidden link.

19. The system of claim 16, wherein a broker mechanism determines said at least one possible action, the broker mechanism including a list of related web pages for the web page.

20. The system of claim 16, wherein prior usage patterns determine said at least one possible action.

* * * * *